United States Patent [19]
Chang et al.

[11] Patent Number: 5,583,914
[45] Date of Patent: Dec. 10, 1996

[54] INTELLIGENT WIRELESS SIGNALING OVERLAY FOR A TELECOMMUNICATION NETWORK

[75] Inventors: James J. Chang; Anil T. Kripalani, both of Randolph; Ashok N. Rudrapatna, Basking Ridge; Jesse E. Russell, Piscataway, all of N.J.

[73] Assignee: Lucent Technologies Inc., Murray Hill, N.J.

[21] Appl. No.: 268,468

[22] Filed: Jun. 30, 1994

[51] Int. Cl.⁶ ................................................. H04Q 7/38
[52] U.S. Cl. ........................ 379/58; 379/63; 379/230
[58] Field of Search ................................ 379/58, 59, 60, 379/63, 67, 112, 207, 210, 230, 209, 144, 143, 114; 455/33.1, 33.2, 54.1

[56]           References Cited
          U.S. PATENT DOCUMENTS 5,353,331  10/1994  Emery et al. ............................. 379/58
5,402,471   3/1995  Van Nielen ............................... 377/60
5,418,844   5/1995  Morrisey .............................. 377/210 X Primary Examiner—Curtis Kuntz
Assistant Examiner—Michael B. Chernoff
Attorney, Agent, or Firm—Alfred C. Steinmetz

[57]                ABSTRACT

A telephone signaling system is operative outside of the traditional calling and data transmission paths to provide originating to termination signaling. Routing of the signaling is in response to a locator system which includes a data base of terminations and a system for keeping up to date information of current termination locations of the intended recipient. In one illustrative embodiment the termination equipment includes locator devices such as GPS locating devices. The information supplied by the GPS locating device is provided to a central data base which routes the signaling system to the intended recipient termination device. The central routing system then selects a voice and data transmission path that optimizes some preselected criteria of transmission. A typical criteria could be cost, or bandwidth or some combination of criteria to be optimized.

10 Claims, 7 Drawing Sheets

USER DEVICE TO NETWORK SIGNALING

FIG. 6   NETWORK TO USER DEVICE SIGNALING
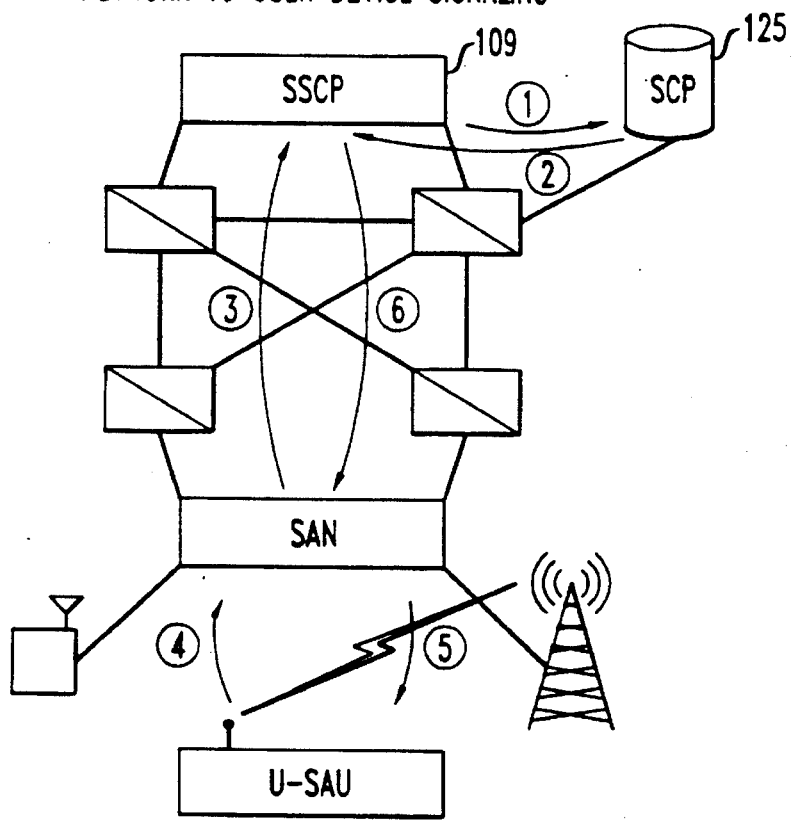
FIG. 7
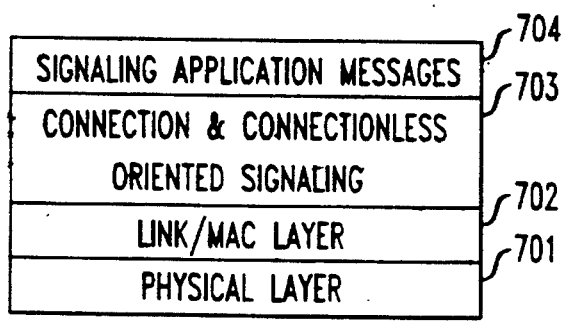
FIG. 8
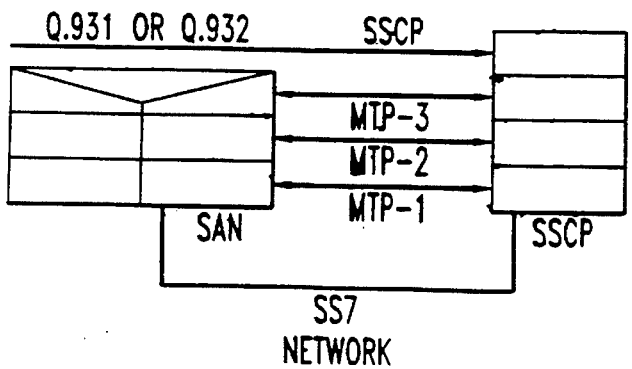
FIG. 12
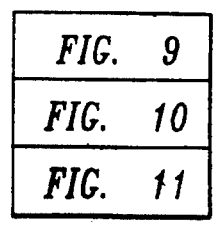

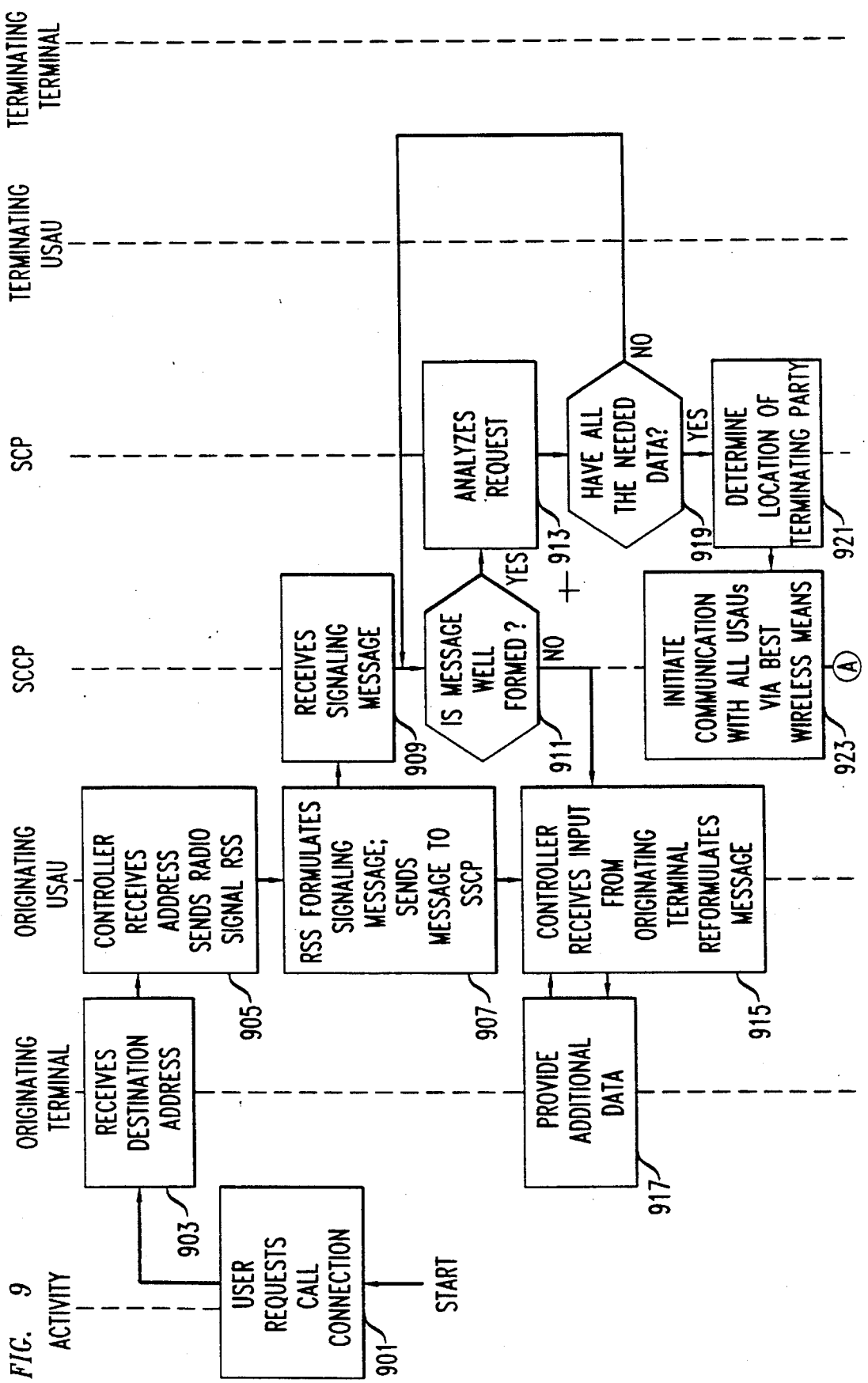

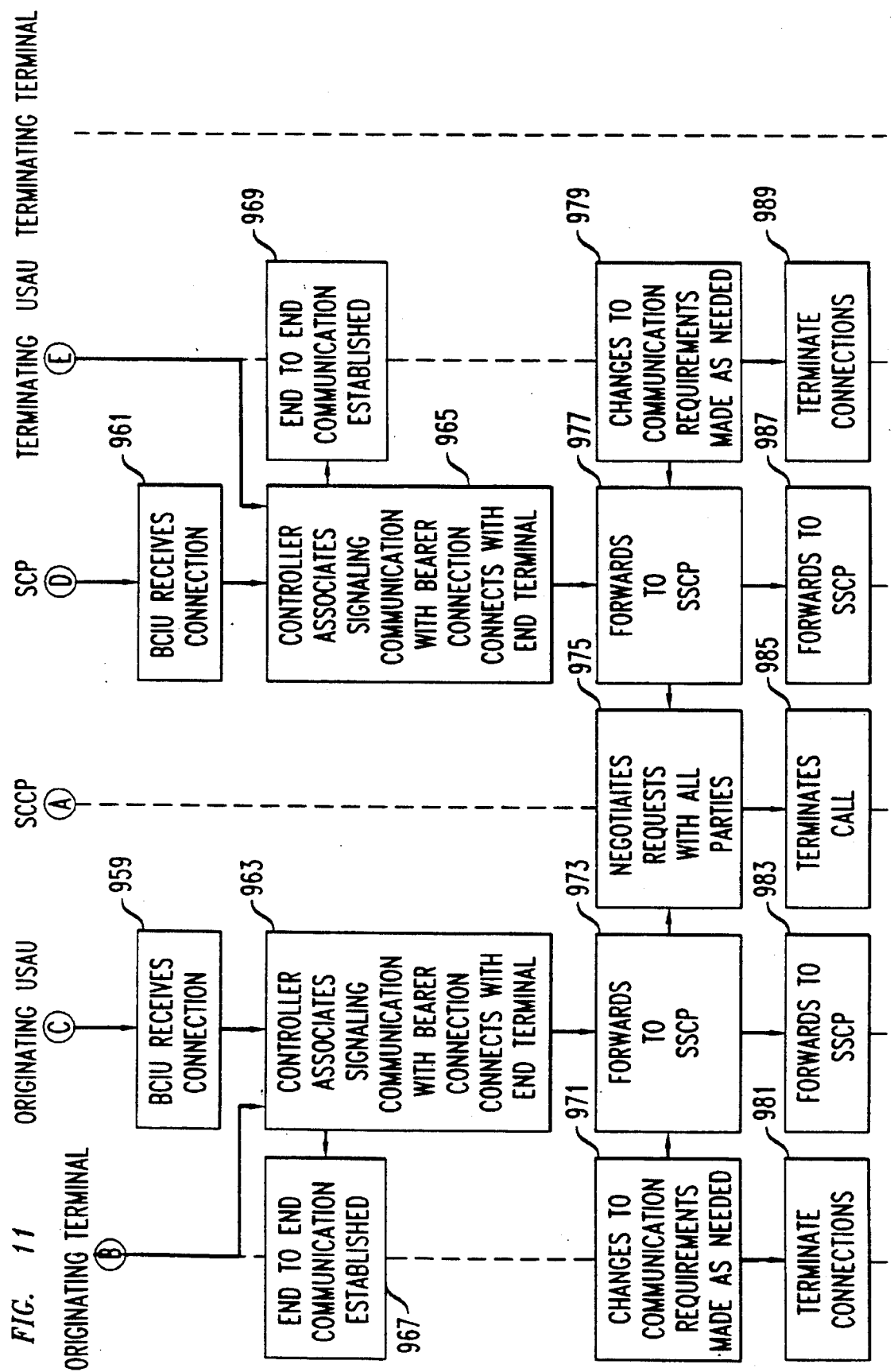

INTELLIGENT WIRELESS SIGNALING OVERLAY FOR A TELECOMMUNICATION NETWORK

FIELD OF THE INVENTION

This invention relates to telecommunication signaling systems and particularly to signaling system arrangements/devices that have system intelligence to select voice, data, messaging, video, multimedia, etc. call transmission routing to enhance preselected overall voice, video and data transmission criteria.

BACKGROUND OF THE INVENTION

Traditionally telecommunication system calls are set up in response to inband signaling by communication set-up or signaling channels that spatially parallel the voice and data call transmission paths. In this arrangement, using inband signaling (inband DMTF, or logically out-of-band but physically inband ISDN D-channel), the initial set-up call routing is substantially fixed. In these existing arrangements a terminal of a landline telecommunication network is always initially connected to the customer premises and/or the local exchange; a wireless terminal is connected to a cell site and to the mobile switching center which connects to a landline telecommunication network. Choices in transmission facilities used is normally selected by the telecommunication bearer network service provider. This rigid hierarchy often results in an overall end-to-end telecommunication connection that is far from optimum in some end-to-end path evaluation or rating arrangement that may be important to the originator or recipient of the call. It is desirable to utilize network resources in a fashion best suited to benefit the users.

SUMMARY OF THE INVENTION

A telecommunication signaling system is operative outside of the traditional calling and data transmission paths to provide originating and termination signaling. Routing of the signaling is in response to a location system which includes a data base of terminal locations and a system for keeping up to date information of current terminal locations of the intended parties. The central routing system then selects a voice/data/video/multimedia transmission path that optimizes some preselected criteria of transmission. Many choices are available at the time of a call set up. Optimization is determined by criteria selected by the calling parties or by some predefined system standard. Typical criteria could include cost, bandwidth or some combination of criteria to be optimized.

In one illustrative embodiment the termination equipment includes locator devices such as global positioning system (GPS) locating devices. The information supplied by the GPS locating device is provided to a central data base which routes the signaling/communications path to the intended recipient termination device, each according to some optimizing criteria.

In a particular embodiment, incorporating the principles of the invention, a wireless signaling control layer is overlayed upon the operational telecommunication network including different telecommunication system apparatus and pathing arrangements. This arrangement is designed to permit an end user/originator to send a service request, for connection to a particular end terminal, via wireless means to a network server that controls management of network services and controls deployment of network resources. Based on the specified parameters of the service request (such as bandwidth, features, end-user location, device characteristics) the network server allocates a communication path through the actual physical information transport network to access the end-user and provide the desired services. This signaling control is independent of the actual information transport system and provides the user and or service providers the capability to customize the actual transport system and activate the specific services selected.

BRIEF DESCRIPTION OF THE DRAWING

FIG. 6 is a schematic for assistance in describing the process of network to user device signaling;

FIG. 7 is a schematic of an illustrative protocol layering used for communication between a signaling access node and the signaling network;

FIG. 8 is a schematic of the illustrative protocol transmission used for communication between a terminal and the signaling network;

FIGS. 9 through 11 is a flow chart detailing the process of the signaling overlay; and FIG. 12 shows how the FIGS. 9 through 11 are joined together.

DETAILED DESCRIPTION

Signaling communication from an originator terminal to an end terminal recipient of a projected call is implemented, in the disclosed embodiment of the invention, as a wireless common channel signaling arrangement. In this disclosed arrangement an information/communications service request is transmitted, at least in part, by a wireless communication instrumentality to a network server in a layer of a multi layered system architecture dedicated in part to call/connection management. This arrangement for setting up a communication path allows the path to be selected from many available alternative paths at an information access level in the system architecture. Since the signaling control is independent of the information communication path the information path and signaling path may be directly and independently optimized to meet any criteria selected by the call originator or the call recipient.

The signaling scheme requires the support of a system wide network. Such support is provided in accord with the invention by a national/global wireless wide area signaling access network (NWSAN). This NSWAN is a signaling network that is completely independent of the user-to-user information communication/bearer channel network. This is an out-of-band signaling network that is physically independent and hence is different than schemes such as ISDN signaling schemes (e.g. having B communication and D signaling on a common physical access line). This signaling arrangement may be but is not required to be physically distinct from the information channel.

With the signaling connection physically independent from the communication/bearer channel connection; the signaling connection may be established utilizing different communication means and technologies and on a differently routed channel than that of the information communication connection. The independence of the signaling connection readily allows continued signaling between the originating and terminating terminals even after the communication/bearer call has been connected. This capability allows continued updating of the bearer connection to meet changed circumstances of a call such as may occur in a multimedia communication.

Locating the recipient of a pending call by the signaling network may be achieved by means of frequent location information communicated to a locator data base within the network. In one illustrative embodiment the location is generated by global positioning system (GPS) techniques with the position/location information communicated by a wireless communication channel to the locator database.

Figure 1:
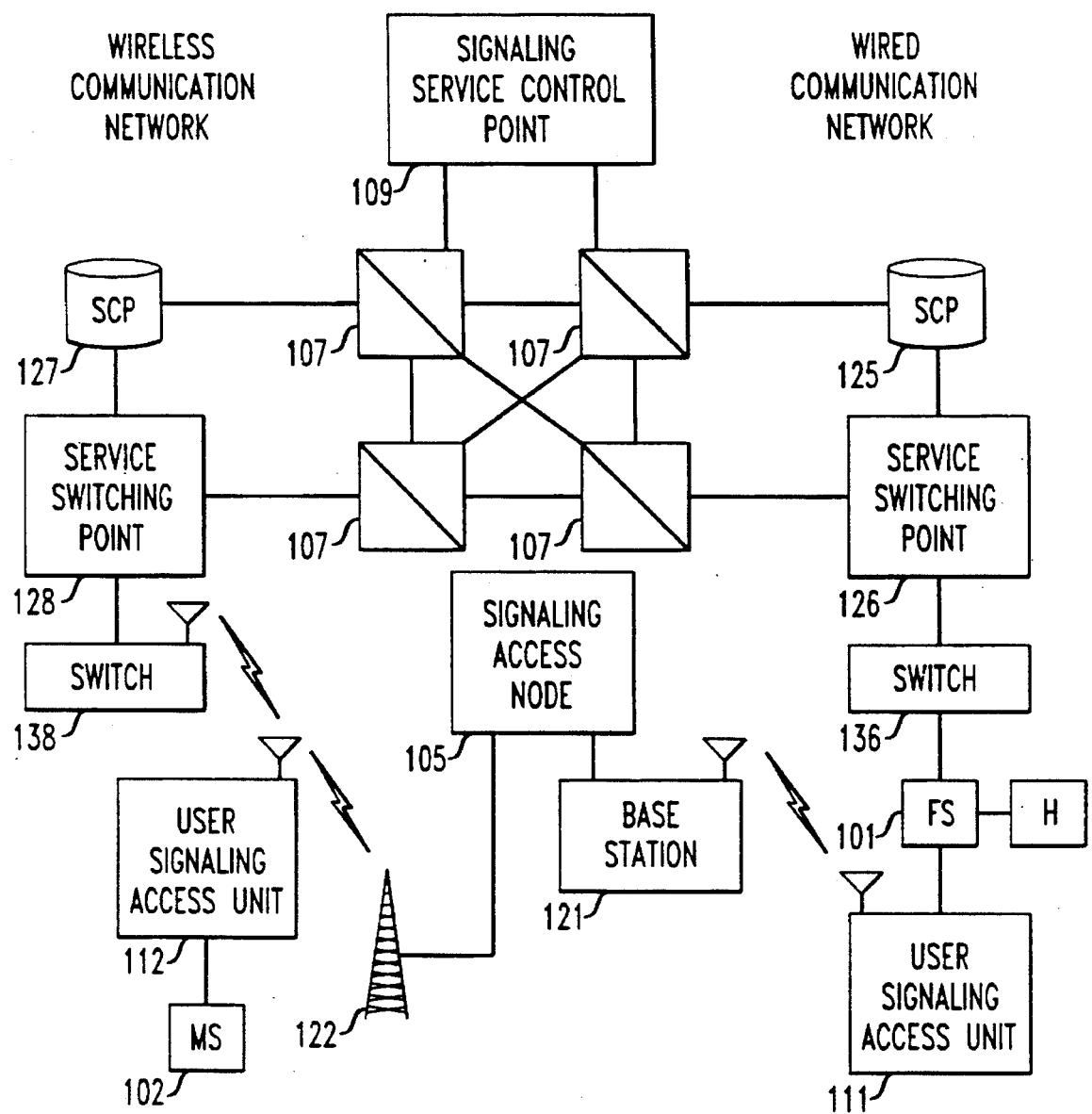
FIG. 1 is a schematic of a telecommunication system having a wireless signal access network incorporating the principles of the invention.

The illustrative NWSAN, as shown in the FIG. 1, illustrates the signaling connection and communication connection from a wired subscriber terminal 101 to a wireless subscriber terminal 102. The system for communicating signaling messages includes a user signaling access unit (USAU) 111 and 112 associated with each of the subscriber terminals 101 and 102. Each subscriber terminal 101 and 102 may each have an access slot for accepting the input of a smart card whose stored data may express the subscriber's desired communication arrangement criteria. The terminal 101 is shown illustratively as being able to accept a smart card 141, which will communicate such criteria to the associated USAU 111.

Each USAU 111 and 112 communicates with a common channel signaling network of a telecommunication switching system, via base station 122. The wireless subscriber terminal unit 101 includes the USAU 111, located either internally or otherwise accessible by connection. The USAU 111 communicates with the wireless common channel signaling network through a wireless channel and the base station 121. A suitable USAU embodiment is a PCMCIA card which may be inserted into a suitable receptacle in the subscriber terminal. Each USAU operates as an agent for the subscriber terminal in arranging a signaling communication with the signaling network. It generates and receives messages on behalf of the terminal devices and responds to signaling network signaling queries.

The base station 121 is connected to a signaling access node (SAN) 105 of the wireless common channel signaling network. This signaling connection is wireless even though the communication or bearer path may be wired. This SAN 105 is a signaling message router and serves as a gateway and provides the protocol translation processing to facilitate communication between the USAU 111 and a network of signaling transport networks 107. It is also a SS7 end point in a SS7 signaling system. It encapsulates and decapsulates USAU signaling messages in SS7 packets. The signaling transport networks 107 in the illustrative embodiment are configured in a SS7 signaling network.

The wired subscriber terminal unit 102 by radio is connected through a radio link in the USAU 112 to a wireless reception antenna 122 which is connected to the SAN 105. The wireless reception antenna/base station 122 is part of a wireless access infra-structure which provides access between USAU 112 and the SAN 105 of the signaling network. The USAU units 111 and 112 each include independent stored data that defines the technical and economic requirements of the associated terminal unit.

All of the signaling transport networks 107 are connected to a signaling message server designated as the signaling service control point (SSCP) 109. The SSCP 109 encapsulates and decapsulates messages sent and received from the SAN 105. The SSCP 109 interacts with other components of the bearer network (i.e. SCP, SSP) in order to set up the proper call execution. It is an SS7 endpoint in SS7 signaling systems. It receives the technical requirements expressed by the USAU units 111 and 112 and determines the appropriate mode of communication and bearer network structure and routing to achieve these objectives.

Each of the wireless and wired bearer networks includes the subscriber data bases at the service control points (SCP) 125 and 127, respectively. Each SCP (125 and 127) receives requests from the network of signaling transport networks 107 under control of the SSCP 109 and sets up the appropriate bearer routing. The bearer routing is accomplished through the service switching points (SSP) 126 and 128 and the associated telecommunication switches 136 and 138. The SSPs 126 and 128 represent units that provide service and call execution. In the case of the terminal 102 of a fixed subscriber the bearer connection is by wireless connection and in the case of the fixed terminal 101 this connection is by wire.

Figure 2:
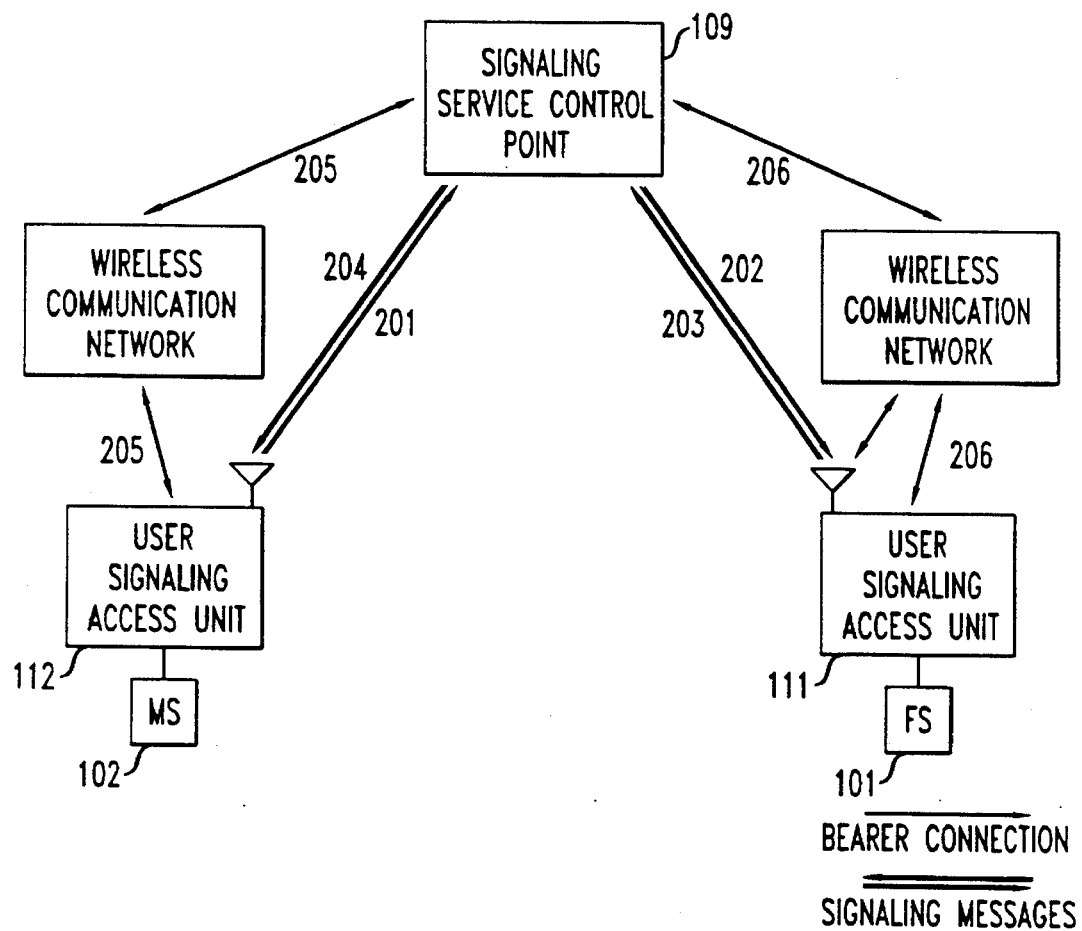
FIG. 2 is a schematic of a call set up as performed by the network of FIG. 1.

A single illustrative process in the set up of a call is shown in the FIG. 2, where the SSCP 109 and USAU 111 and 112 of FIG. 1 are shown to illustrate the signaling interaction. The single line connections represent bearer connections and the double line connections show signaling transport connections. The process begins when a particular user requests a call connection to a selected end terminal recipient. In the illustrative embodiment the mobile subscriber 102 initiates a call. The USAU 112 determines the type of call facilities needed (e.g. data, multimedia etc.) and transports this information to the SSCP 109 via signaling path 201. The SSCP 109 investigates the various paths available and by utilizing the signal paths 202 and 203 determines the ability of the selected end terminal 101 to meet the call requirements. The USAU 111 of the intended recipient replies, via signal path 203, expressing its call capabilities and preferences to the SSCP 109. The SSCP 109 confirms call completion ability to the calling terminal 102, via signal path 204. The bearer network, connecting terminals 101 and 102, is connected via the bearer connections 205 and 206 under control of the SSCP 109 and the call connection is complete. The signaling network remains active and operative to change bearer connections to accommodate any changed call requirements or conditions. The bearer network has the capability of supporting the voice, data, video, multimedia or other requirements that the parties have requested. If no such capability can be determined by the signaling network, the call process may be terminated with notice to the participating parties.

Figure 3:
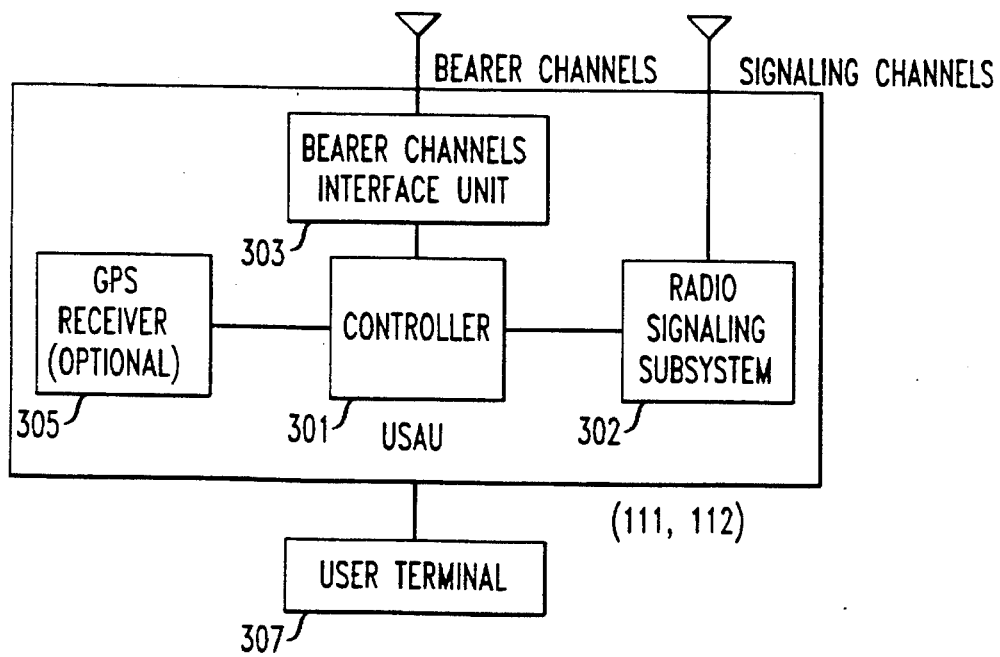
FIGS. 3 and 4 are block schematics of user signaling access units used in the network of FIG. 1.

An illustrative embodiment of the USAU (111,112), for connection to wired bearer networks, is shown in the block schematic of the FIG. 3. The unit is controlled by a stored program controller 301 which controls the radio signaling subsystem 302 which communicates and receives call request information to and from the SAN unit shown in the FIG. 1. The bearer channel interface unit 303 connects the subscriber interface unit 304 to the wired bearer channels. An optional GPS 305 is provided to provide location information for use of the signaling network. GPS locator systems are well known and need not be disclosed in detail. The user terminal 307 may comprise a cellular phone, a wired phone, a data processing terminal, a video device or a multimedia terminal.

Figure 4:
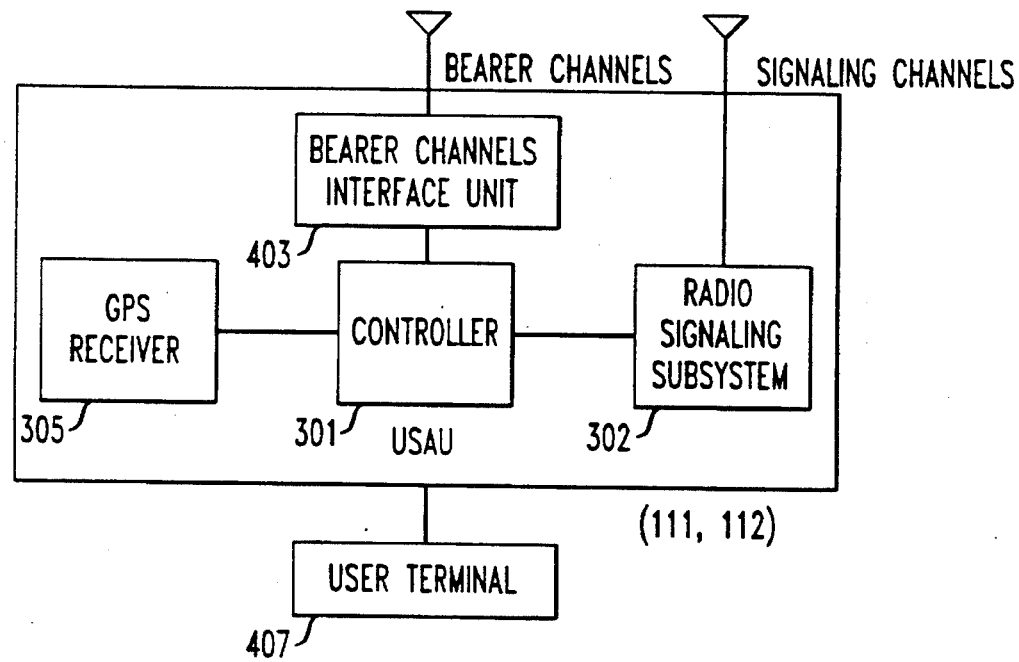

A USAU unit used for wireless communications is shown in the FIG. 4. In this embodiment the bearer channel interface unit is a wireless unit 403 for facilitating a wireless connection to wireless bearer channels. The balance of this unit is identical to that of FIG. 3. In this illustrative embodiment the GPS 305 will be needed in most instances. As above the user terminal 307 may comprise a cellular phone, a wired phone, a data processing terminal, a video device or a multimedia terminal.

Figure 5:
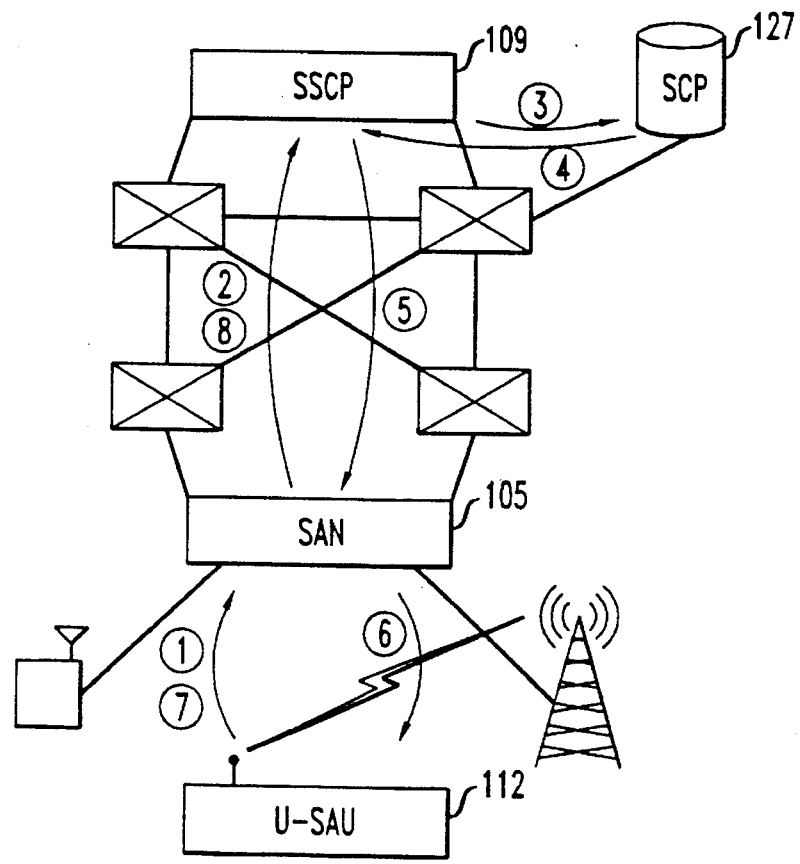
FIG. 5 is a schematic for assistance in describing the process of user device to network signaling.
Figure 10:
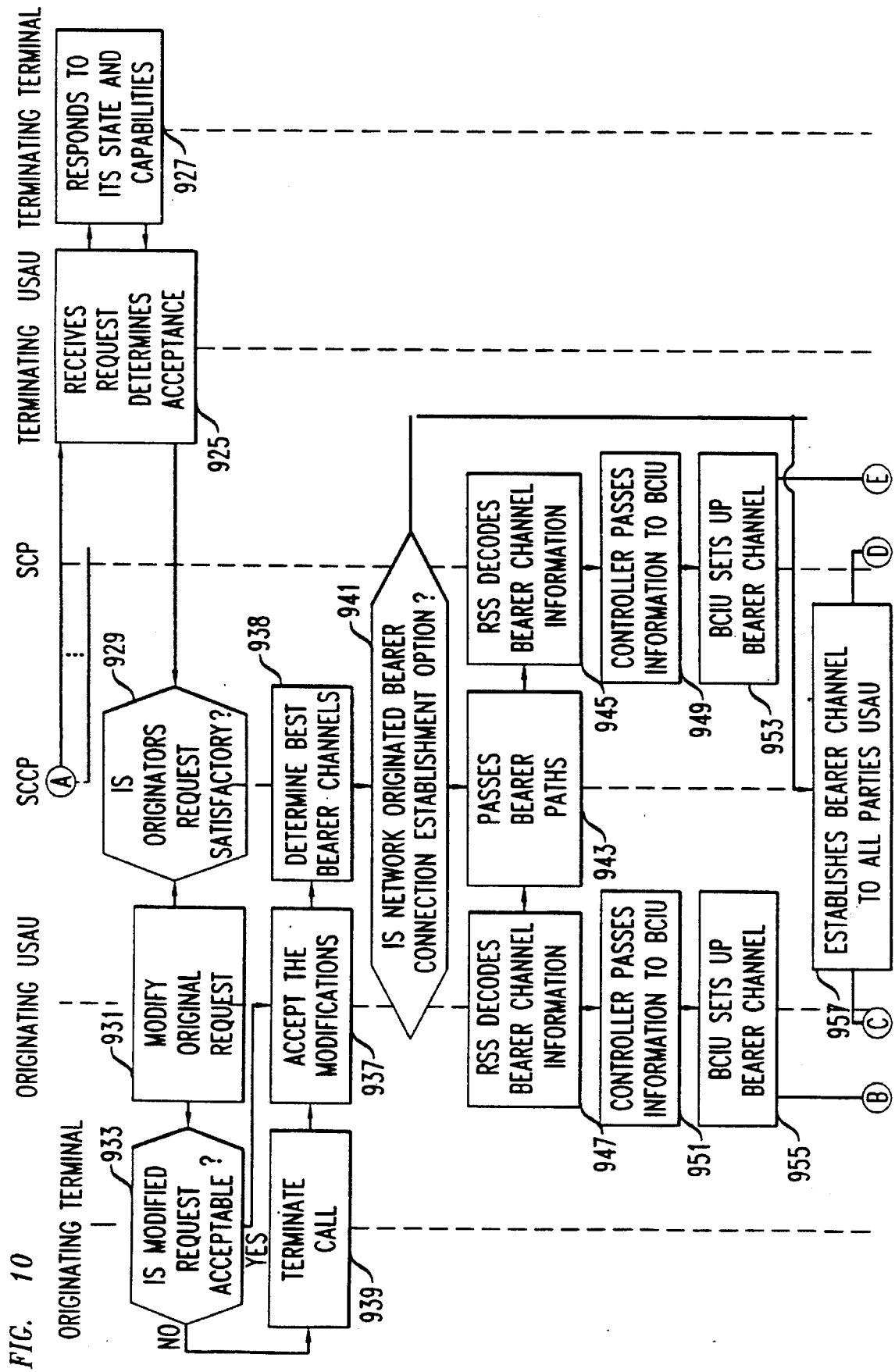

While the system diagram of FIG. 2 has shown an illustrative call set up process the process is shown in the FIGS. 5 and 6 from the aspect of the calling and called parties. This call process is shown in this fashion to illustrate the independence which may be exercised by the calling and called parties in setting up a call between the two.

The schematic of FIG. 5 shows the network components and call flow of the system being used by a calling party requesting the set up of a call. This schematic shows the user device to network signaling process. As shown in the FIGS. 3 and 4 the user originating telecommunication device includes a user signaling access unit 112 which signals the request for a call connection at the request of the caller. This signaling to the signaling network is by wireless means as shown in the FIG. 5 and is depicted by the flow arrow 1. The access control in accord with the illustrative embodiment utilizes an existing wireless protocol (such as shown in FIG. 7 and discussed below) or may use a new packet protocol. The protocol used is dependent upon the application requested. In some applications such as multimedia the signal protocol must support intensive signaling over the extent of the call while in basic telephone calls the signaling is required only at the beginning and end of the call.

The Signaling Access node (SAN) 105 transmits the call request through the signal transport network, via flow path 2, to the Signaling Service control point (SSCP) 109. The SSCP 109 communicates with the SCP 127 to access subscriber data base information, via flow path 3, and to locate the intended recipient of the call. The accessed information is returned to the SSCP 109, via the flow path 4. The SSCP 109 interprets the callers requests in light of the data and replies, via flow paths 5 and 6, to the USAU 112 to collect additional data or to determine acceptance by the caller. The USAU 112 replies, by flow paths 7 and 8, to either accept suggested set up or to request additional data and reject or confirm the call arrangements.

Upon the acceptance of the callers request the process proceeds to the receiving or terminating party or parties. The response of one terminating party is shown in the FIG. 6. It is to be understood that this terminating party may be only one of several terminating Each of the intended recipients would respond as shown in the response of FIG. 6, and hence the added details are not provided. With multiple recipients the network bridges all recipients to a bearer network, which may be unique, to the calling party. parties with which the caller is attempting a connection. The location of the terminating party has been supplied by the SCP and the USAU 111 of the terminating party has received the call request. A signaling dialog is established with the terminating USAU 111 to provide a telecommunication path that is acceptable to both the originating and terminating parties.

The SSCP 109 requests the terminating party information from the SCP, via flow path 1 and receives the information, via flow path 2. It transmits the call request, via flow paths 3 and 4, to the termination USAU 111. The USAU 111 evaluates this request and replies to the SSCP 109, via flow paths 5 and 6, signaling acceptance, rejection or transmits a requested modification. This signaling follows the same protocol and wireless access techniques as indicated with respect FIG. 5. As indicated this process may involve a plurality of terminating stations each negotiating with the network for its desired call set up terms.

An illustrative protocol layering is shown in the diagram of FIG. 7. The illustrative layering includes a physical layer 701 comprising the final transmitted electrical bits and which subsumes the next layer 702 above it. The layer 702 is the link layer which establishes the frame boundaries for the signal. The next higher layer 703, the network layer, determines the routing of the signaling. The signaling messages are embedded in the layer 704.

A illustrative schematic of the transmission of these layered messages is shown in the FIG. 8. In this particular illustration SS7 signaling is used and the SAN, as shown, provides the translation between the USAC and the SSCP. As shown the SAN provides the translation required for the physical, link and network layers of the protocol.

An understanding of the signaling process may be readily attained in examination of an illustrative flow chart of the process. This process as shown comprises a series of individual processes whose execution is distributed at various individual network components throughout the signaling network. The overall signaling process begins in the origination of a subscriber call request as designated in the block 901. The originating terminal receives the caller call request as per block 903 and this request is forwarded to the originating USAU causing a radio signal to be transmitted to the SAN as per block 905. The request is forwarded from the originating USAU to the SSCP of the signaling network, as per block 907, and is received by it as indicated by block 909. The SSCP determines if the request signal is well formed (i.e. in accord with the system requirements) as per block 911. If the request signal is not well formed the flow proceeds to the originating USAU, as per block 915, and the controller corresponds with the originating terminal, as per block 917, to reformulate the signaling message. The reformulated signaling message is returned for reprocessing, as per block 907. If the message is well formed, as determined by block 911, the request is analyzed as per block 913 in the SCP. The SCP inquires if it has all the needed data as per block 919. If it does not, process flow returns to the decision block 911. With all needed information available the data base of the SCP determines the location of the intended call recipient(s), as indicated in block 921. The control returns to the SCCP which operates to connect to the USAU of both the caller and end terminal recipient via the best available wireless communication means. It sends a request message to the USAU of the recipient(s), as indicated in the block 925, which in turn determines the state of the receiving terminal as shown in the block 927.

The process flow now returns to the SSCP which operates to determine, as per block 929, if the originators call request is satisfactory. If it is the SSCP proceeds to determine the best bearer channels to accommodate the terms of the call request as indicted in the block 935. if the originators request is not satisfactory the flow proceeds to the originating USAU and the request is modified as per block 931. The originating terminal determines if the modification is acceptable as per block 933. If it is the modification is accepted, as per block 937, and the flow proceeds to the block 935 which determines the best bearer channels. If the request is not acceptable the flow terminates in block 939 at the originating terminal.

The SSCP determines if the network routing determined is a network establishment option connection, as per decision block 941, and in the affirmative proceeds to the block 957. The flow proceeds to the blocks 959 and 961 to the bearer channel information units and then to the blocks 963 and 965 to direct the controllers of the USAUs to establish the bearer channels to connect all the parties. In the event of a negative response the SSCP passes the bearer information to the originating and terminating USAU as per the block 943, which is decoded in the blocks 945 and 947. In each unit flow of the information is passed to the bearer channel information units in the blocks 949 and 951. In each flow path the bearer channel information units set up bearer channels as per blocks 953 and 955. The flow proceeds in parallel to the blocks 963 and 965 whose instructions convert the signaling message into a bearer connection, and the connection between end terminals is established according to designated communication requirements.

Any additional changes requested by any party (after the initial call establishment will be accommodated; if authorized and if possible as indicated in the blocks 971 and 979 and this information is forwarded (via blocks 973,977) to the SSCP (block 975) as requested by the parties. The signaling connection remains intact to permit modifications to the bearer connection as may be required by changing call characteristics.

The ultimate termination of the call is reflected in the command to terminate signaling network connections between the originating and terminating terminals in the blocks 981 and 989. This command is forwarded to the USAUs as per blocks 983 and 987 to the SSCP which terminates the signaling connection as per block 985 and the process is complete.

We claim:

1. A wireless common channel signaling network for locating a called telephone station and connecting a caller station with a called station with a bearer communication network set up according to criteria selected through the signaling network, comprising:

the bearer communication network including a wired/wireless communication network, a network of a plurality of signaling transport networks, a plurality of service switching points, for interconnecting the network of a plurality of signaling transport networks to telephone switches, and a signaling service control point connected to control a set up of a bearer network routing;

the wireless common channel signaling network including:

a signaling access node for connecting a caller station and a called station to the network of a plurality of signaling transport networks; and a first and a second user signaling access unit connected to the caller station and the called station respectively; each signaling access unit including a stored program controller having a data base of subscriber based requirements, and a radio signaling system for communicating subscriber based requirements to and from the signaling access node and a bearer channel interface unit for communicating with the bearer network;

the signaling access node communicating subscriber based requirements to the signaling service control point which sets up bearer network routing;

and the bearer channel access unit communicating voice/data/video signals with the bearer network set up by the signaling service control point.

2. A wireless common channel signaling network as claimed in claim 1, with each user signaling access unit further including a GPS receiver for generating a location signal which is communicated by the user signaling access unit to the signaling access node.

3. A wireless common channel signaling network as claimed in claim 1 wherein the bearer channel interface unit communicates with the bearer network by wireless communication.

4. A wireless common channel signaling network as claimed in claim 1 wherein the bearer channel interface unit communicates with the bearer network by wired communication.

5. In a signaling system for controlling bearer path connections and having a signaling network including a originating and terminating terminal signaling access unit (USAU), each associated with the originating and terminating terminals, that communicates with a signaling service control point (SSCP) of the signaling network for effecting bearer connections and specifies to the SSCP desired system characteristics and parameters, in real time, of the intended bearer connection, characteristics, a method of controlling the bearer connections, comprising the steps of: formulating a call request message, including proposed terms of a bearer connection, at the originating USAU; transmitting the call request message to the SSCP; determining if the call request message is well formed; reformulating the call request message at the originating USAU if it is not well formed; upon attainment of a well formed call request message, analyzing the well formed call request message for needed information to locate a desired terminating terminal; upon attainment of the needed information, initiating a communication with the terminating USAU of the terminating terminal requesting acceptance of the call request; evaluating at the terminating USAU desirability of the proposed terms of a bearer connection; modifying the proposed terms of a bearer connection at the SSCP in response to a non-acceptance message of the terminating USAU if the proposed terms of a bearer connection are not satisfactory to modify the proposed terms of a bearer connection in accord with modifications provided by the terminating USAU; upon acceptance of the proposed/modified terms of the proposed bearer connection the SSCP transmitting the terms to both the originating and terminating USAU; completing the proposed bearer connection by the SSCP in response to its acceptance by both the originating and terminating USAU.

6. In a signaling system a method of controlling bearer path connections as claimed in claim 5; further including the step of determining in response to the step of acceptance of the proposed/modified terms immediately establishing the bearer connections bypassing the step of transmitting the terms to both the originating and terminating USAU and having the SSCP set up the bearer connections.

7. In a signaling system a method of controlling bearer path connections as claimed in claim 5; wherein the step of transmitting the call request message to the SSCP includes the step of protocol conversion between the USAU and the SSCP.

8. In a signaling system a method of controlling bearer path connections as claimed in claim 5; wherein steps including communication between the SSCP and the originating and terminating USAU includes transmitting a message by wireless transmission.

9. In a signaling system a method of controlling bearer path connections as claimed in claim 5; further including the step of modifying bearer connection characteristics at any stage in an existing bearer connection.

10. In a signaling system a method of controlling bearer path connections as claimed in claim 5; wherein the originating and terminating USAUs are located in response to GPS locator information supplied to the signaling system.

* * * * *